United States Patent

[11] 3,545,598

| [72] | Inventor | Hebert E. McGinnis<br>Akron, Ohio |
|---|---|---|
| [21] | Appl. No. | 687,557 |
| [22] | Filed | Dec. 4, 1967 |
| [45] | Patented | Dec. 8, 1970 |
| [73] | Assignee | The B.F. Goodrich Company<br>New York, New York<br>a corporation of New York |

[54] LATERALLY FLEXIBLE BELT CONVEYOR
12 Claims, 11 Drawing Figs.

[52] U.S. Cl.................................................. 198/201,
198/192
[51] Int. Cl...................................................... B65g 15/40
[50] Field of Search........................................ 198/201,
181, 182, 191, 192, 193

[56] References Cited
UNITED STATES PATENTS

| 977,987 | 12/1910 | Willson........................ | 198/192 |
| 1,816,559 | 7/1927 | Anderson..................... | 198/193UX |
| 2,818,962 | 1/1958 | Hoerth......................... | 198/201X |
| 3,399,758 | 9/1968 | Karr............................. | 198/181 |
| 2,303,762 | 8/1941 | Reimel......................... | 198/201 |
| 3,464,538 | 9/1969 | Hartmann.................... | 198/201 |

FOREIGN PATENTS

| 1,110,561 | 10/1955 | France......................... | 198/201 |

*Primary Examiner*—Evon C. Blunk
*Assistant Examiner*—Douglas D. Watts
*Attorney*—Harold S. Meyer ABSTRACT: A belt conveyor capable of sharp lateral curvature, including a belt with a central inextensible flexible spine and corrugations extending from the spine transversely to the edges, supported on moving surfaces extending at an angle to the corrugations for bridging the grooves of the corrugations. Preferably the corrugations are at a trailing angle to the spine, and the edges of the belt are at an angle to the flat center to form a trough, and the supports are transverse rolls.

INVENTOR
HEBERT E. McGINNIS
BY Harold S Meyer
ATTY.

INVENTOR
HEBERT E. McGINNIS
BY Harold S. Meyer
ATTY.

INVENTOR
HEBERT E. McGINNIS
BY Harold S. Meyer
ATTY.

LATERALLY FLEXIBLE BELT CONVEYOR

BACKGROUND

Heretofore belt conveyors have been operated in generally straight paths without transverse curvature, or in those few instances in which a curved path is followed, the curvature has been very gradual so that a pronounced difference in direction has required a curve extending over a very great distance. In situations where sharp changes of direction have been required, as in mine galleries, it has consequently been the practice to transfer the load from one straight conveyor to another or else to use a type other than a belt conveyor such as an apron conveyor or a flight conveyor operating a curved rigid or articulated frame, all of which are expensive, inefficient, and troublesome to operate.

SUMMARY OF THE INVENTION

According to this invention a belt conveyor is made with a central inextensible flexible spine which may be a cable or cluster of cables embedded in elastomer such as a suitable grade of rubber material, and the portion of the belt on either side of the spine is made longitudinally extensible and contractible by forming it with transverse corrugations extending from the spine to the outer margins of the belt.

Such a transversely corrugated belt with the corrugations at right angles to the spine will not operate smoothly over conventional supporting rollers unless they are of large diameter, since the corrugations in such a case will be parallel to the rollers and the contact of successive corrugations with the rollers will produce objectional vibration. The belt is accordingly supported on moving surfaces which are not parallel to the corrugations but at an angle to them, so that the supporting surfaces will bridge the space of groove between the projecting surfaces of adjacent corrugations.

Such supporting surfaces in the case of conveyor belts having corrugations at right angles to the spine may consist of supporting belts tautly held between pairs of pulleys which may be either idlers or driven as may be most appropriate in each situation.

If the corrugations are arranged an at an angle substantially smaller than a right angle with respect to the spine and are closely enough spaced, ordinary transverse cylindrical rollers, which may be either idlers or driven, can be used for supporting the belt. In such an arrangement each roller will engage each corrugation progressively over its length, and will still support a preceding corrugation while engaging an end of the corrugation which follows it.

With either of the foregoing types of support bridging the space between one corrugation and the next, it has been found that such belts will operate smoothly and satisfactorily both in straight runs and in going around quite sharp curves such as those required for passing from one mine gallery to another intersecting it from one side.

It has also been found that the edges of such transversely corrugated belts can be formed with a substantial upward inclination at the margins, for example at 20° to 50° to the horizontal center portion, so that the belt will have the troughed shape which has been found by experience to permit the carriage of a maximum volume of goods. Such an upward inclination of the margins does not require use of troughing rollers such as are ordinarily used in the operation of flat belt conveyors, since the lateral corrugations stiffen the belt sufficiently to prevent the weight of the load from flattening out the upwardly inclined margins.

A further incidental but important benefit is that the corrugated belts will carry bulk materials up much steeper inclines than conventional flat conveyor belts, so that belts for lifting materials to a higher elevation can be quite short and therefore economical to provide and operate.

BRIEF DESCRIPTION OF THE DRAWINGS

In the accompanying drawings, FIG. 1 is a diagrammatic top view of a straight portion of one embodiment of the laterally flexible conveyor belt with right angle corrugations and narrow supporting belts, not showing conventional bearings, framing, and the like.

DETAILED DESCRIPTION

Figure 1:
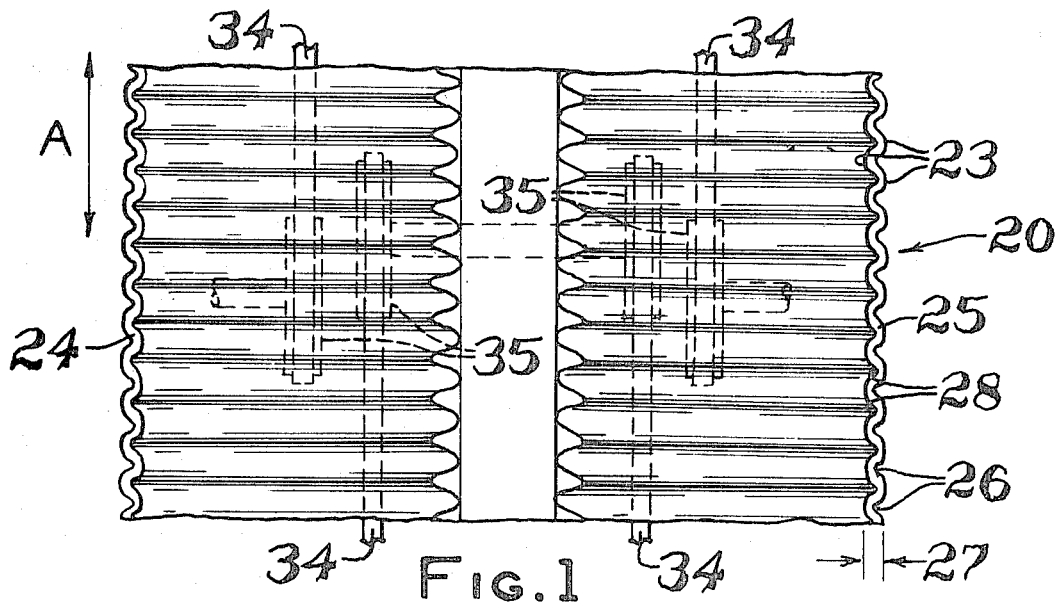
Figure 2:
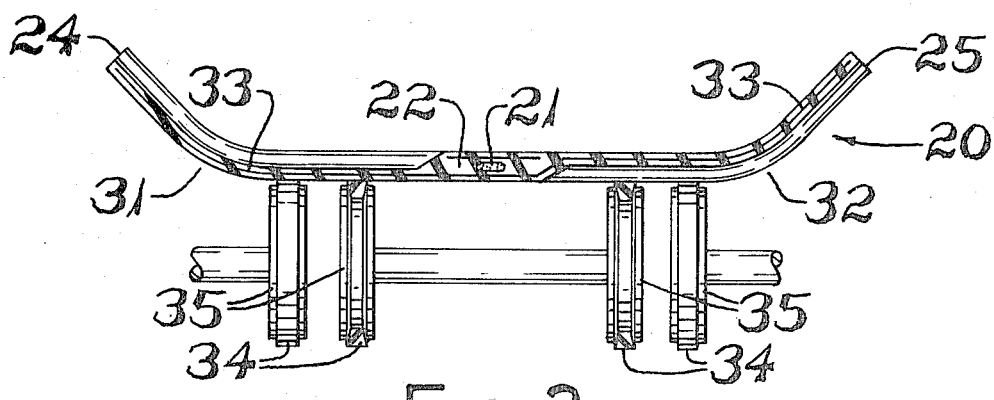
FIG. 2 is a cross section and FIG. 3 is a side view of the same embodiment.
Figure 3:
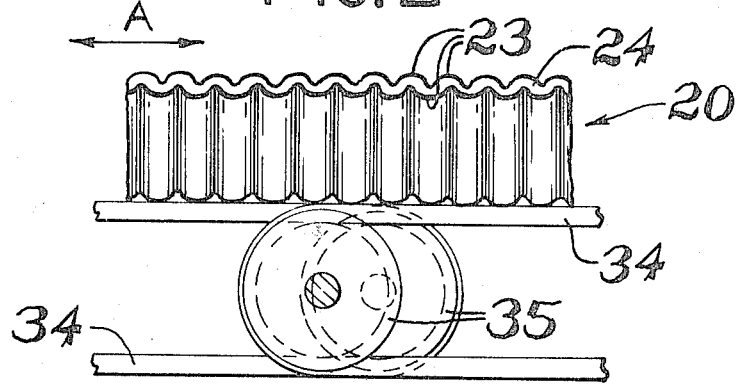

Referring to FIGS. 1 to 3, the belt 20 of this invention in the embodiment shown is made with a steel cable 21 or cluster of cables forming the central spine of the belt and embedded in suitable elastomer 22. On either side of the cable 21 the belt is molded with lateral corrugations 23 which in this case extend at right angles to the spine.

Figure 4:
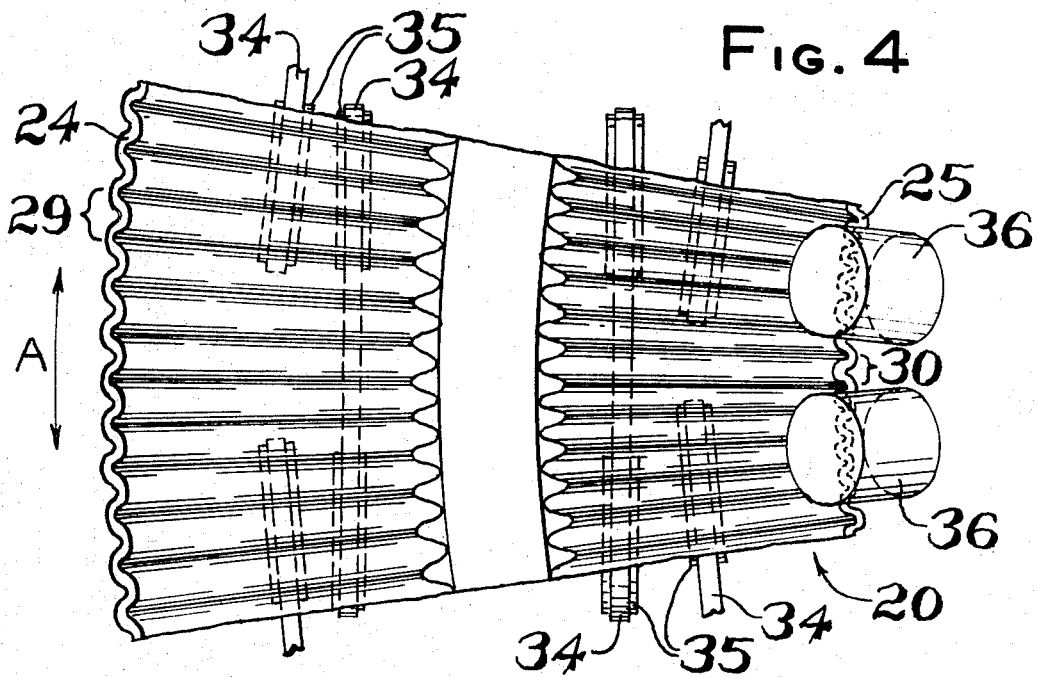
FIG. 4 is a top view of a curved portion of the same belt.

The corrugations 23 in the margins are for the purpose of longitudinal extensibility and contractability of the opposite margins in going around sharp curves, as shown in FIG. 4. The corrugations should accordingly start close to the central cable spine 21 and extend without interruption to either edge 24, 25. In addition, the corrugations should be deep enough to permit the necessary local changes in length of the margins, as the belt passes around curves, by bending of the corrugated material rather than by longitudinal stretching or compression of the rubber. This means that the grooves 26 of the corrugations should extend well past the center of the thickness 27 of the belt, so that the thickness of the remaining material is less than half of the total distance from top to bottom of the corrugations. It is preferred that the corrugations be symmetrical and semicircular, so that the portions 28 in the center of the thickness have their sides perpendicular to the top and bottom faces of the belt and can undergo separation 29 and convergence 30 with equal facility during the extension and contraction of the edges as they pass around the outside or inside respectively of a lateral curve of the path of the belt, such as the one shown in FIG. 4.

The entire belt including the corrugations is inclined upwardly about a quarter of the width 31, 32 from each edge 24, 25, at an angle of 45°, as shown in FIG. 2. The margins of the belt are formed with edge faces 24, 25 which lie in a plane normal to the corrugated top and bottom surfaces of the edge portion of the margins of the belt, so that the margins will run smoothly against guide rollers at points where such guide rollers may be needed.

Although it is not essential to reinforce such a belt, it is preferable to do so by embedding one or more layers of fabric 33 in the belt. Such fabric reinforcement can be of any nearly inextensible material such as textile, glass, wire, and the like, and is preferably of parallel cords of essentially inextensible material such as cabled fine steel wire (such as is used as tire cords in steel cord tires) between the faces of the belt, and with the cords parallel to the corrugations.

The conveyor belt 20 is supported by a belt or belts 34 which may be driven or idle but are preferably arranged with no gaps or only short gaps in the longitudinal support. Thus a succession of overlapping runs of tautly stretched flat belts or flat topped V-belts on either side may be operated on suitable sheaves 35 whose flanges do not project beyond the tops of the belts. The sheaves for successive runs may be on a single shaft, but for best support the supporting belts should be kept quite taut and may be on separate shafts for ready adjustment of tension.

Because of the essentially continuous longitudinal support of the conveyor belt 20 by the taut supporting belts 34 bridging the corrugations 23, the belt will operate smoothly both unloaded and fully loaded and running at high speeds instead of bouncing violently over each support as would be the case if supporting rollers of normal size parallel to the corrugations were to be used.

This belt 20 can operate in either direction as indicated by the double-ended arrows A in FIGS. 1—3 and FIG. 4, because of its symmetrical construction.

The belt described above does not require troughing rollers such as are needed to maintain ordinary flat conveyor belts in a troughed position, since the corrugations 23 stiffen the margins in the lateral direction sufficiently for support of the load without flattening, particularly when further stiffened by wire cords. Since the omission of troughing rollers eliminates their guiding function, it will generally be desirable to supply guide rolls engaging the plane edge faces 24, 25 of the belt at suitable intervals.

When it is desired to operate the belt around a curve, as shown in FIG. 4, the pairs of pulleys 35 carrying the supporting belts 34 will ordinarily be spaced quite close together and the supporting belts will correspondingly be quite short so that the longitudinal support provided by each belt 34 will be short enough to minimize the lateral slippage resulting from movement of the conveyor belt in a curved path while the supporting belt 34 takes an essentially straight path. In addition, it will generally be necessary to employ more or less closely spaced edge guide rollers 36 along the inner curved edge to resist the tendency of the tension in the conveyor belt 20 to straighten it out as it traverses the curve.

In a preferred embodiment shown in FIGS. 5 to 10, the conveyor belt 40 has corrugations 43 which, instead of being at right angles to the central spine 21, are at an angle substantially smaller than a right angle and with a spacing between the corrugations such that any transverse line will intersect at least two corrugations on the portion of the bottom of the belt on either side of the spine 21 inward of the upwardly inclined margins 51, 52. Again the belt is preferably provided with wire cord reinforcement 33 parallel to the corrugations and its margins 51, 52 are preferably molded with an upward inclination so that it will operate as a troughed belt to carry a maximum load of goods. With belts reinforced with inextensible cords 33 of steel so that the margins can be made thin with closely spaced corrugations, an angle of the corrugations of 60° to 70° to the central spine is suitable.

Figure 10:
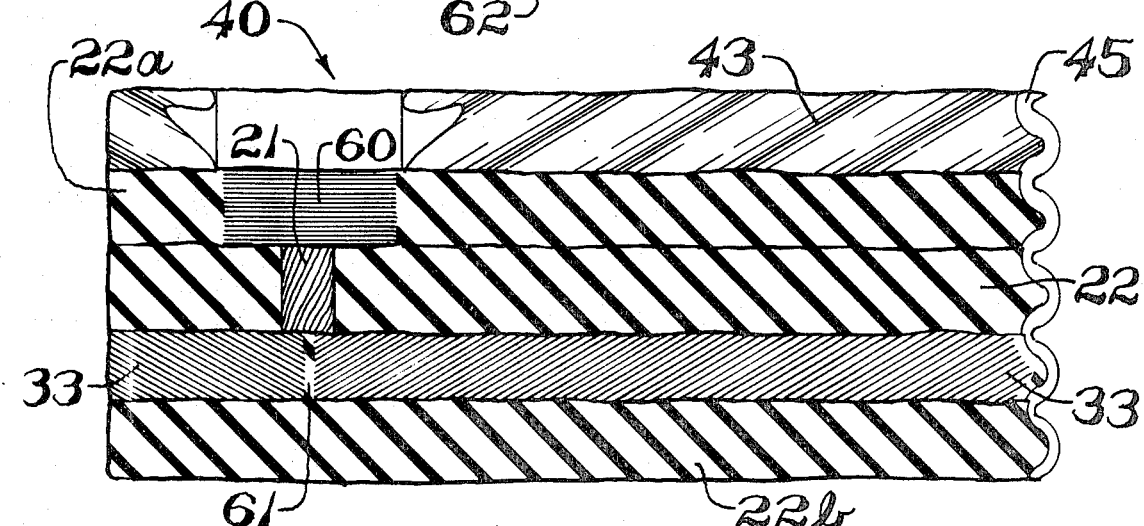
FIG. 10 is a cutaway view of the preferred form of the belt on an enlarged scale.

FIG. 10 shows the internal construction of a belt of the kind shown in FIGS. 5 to 9. The central spine 21 consists of a heavy steel cable or a cluster of closely adjacent cables of a strength adequate to transmit the entire longitudinal tension when the belt is in operation. A single flattened cable or a flat braid of steel strands can be used. The transverse corrugations 43 are at an angle of 60° to 70° to the spine 21 and contain an array of steel cords 33 parallel to the corrugations, extending from the center of the belt under the cable spine 21 in both directions nearly to the edges 44, 45. In addition, more steel cords 60 are placed over the cable spine 21 and perpendicular to it, stopping short of the corrugations 43, so as to bridge the gap 61 between the oppositely inclined portions of the main reinforcing cords 33 and insure lateral integrity of the belt. The reinforcements 33 and 60 are embedded in tough, abrasion resistant rubber of a suitable thickness at the top 22a and bottom 22b to resist the wear encountered in service for a reasonable length of time.

Thus the belt 40 of the particular shape described above contains the following components in order from top to bottom: an abrasion resistant rubber top cover 22a, a narrow layer of transverse cords 60, the central cable spine embedded in rubber 22, the oppositely inclined reinforcing cords 33 separated by a small gap 61, and an abrasion resistant bottom cover 22b.

Figure 5:
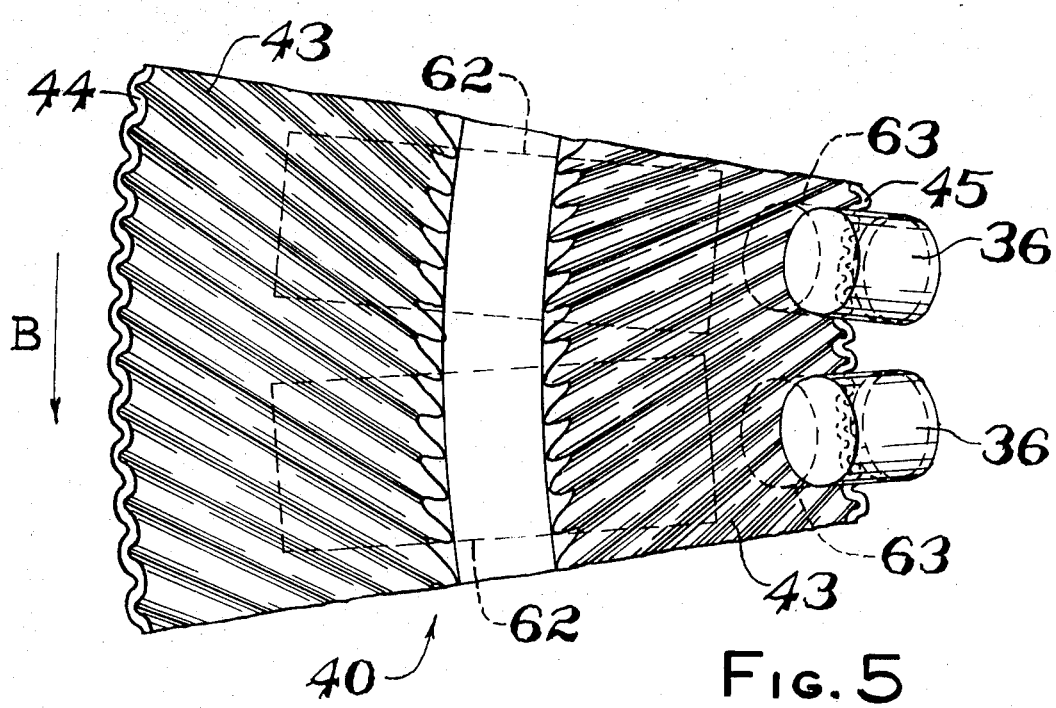
FIG. 5 is a diagrammatic top view of a curved portion of another embodiment having inclined corrugations.
Figure 6:
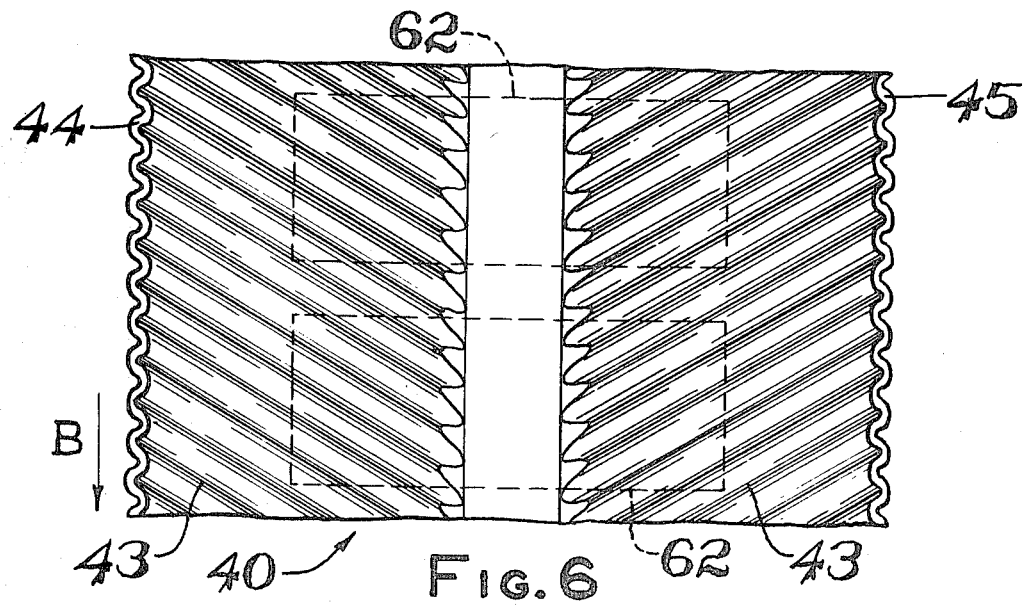
FIG. 6 is a top view of a straight portion of the same belt.
Figure 7:
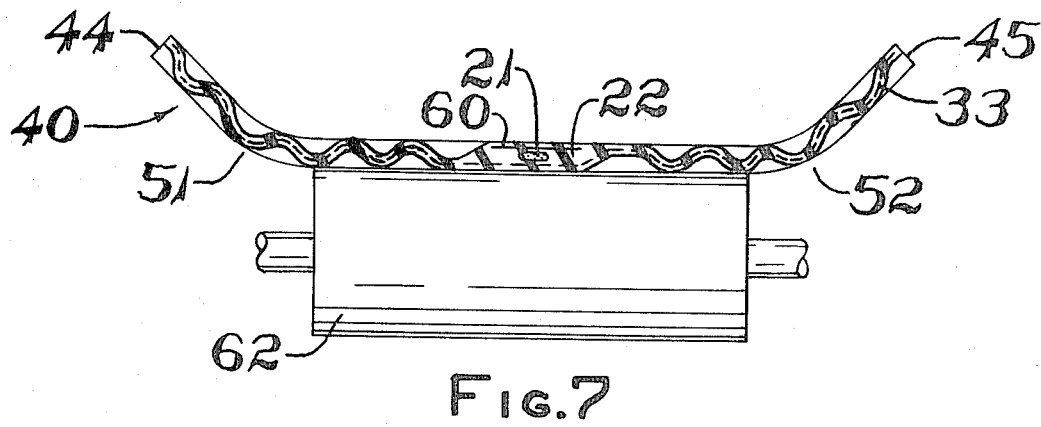
FIG. 7 is a cross section and FIG. 8 a side view of this embodiment.
Figure 8:
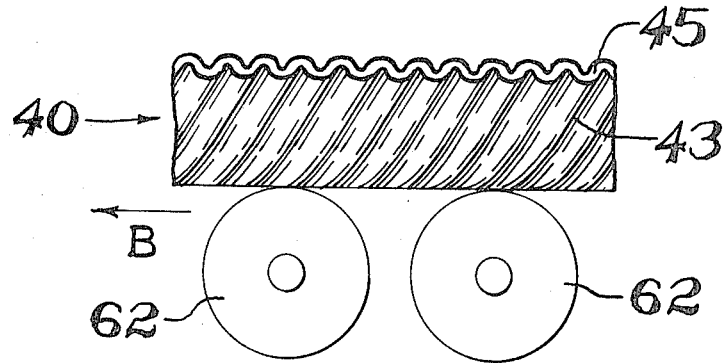
Figure 9:
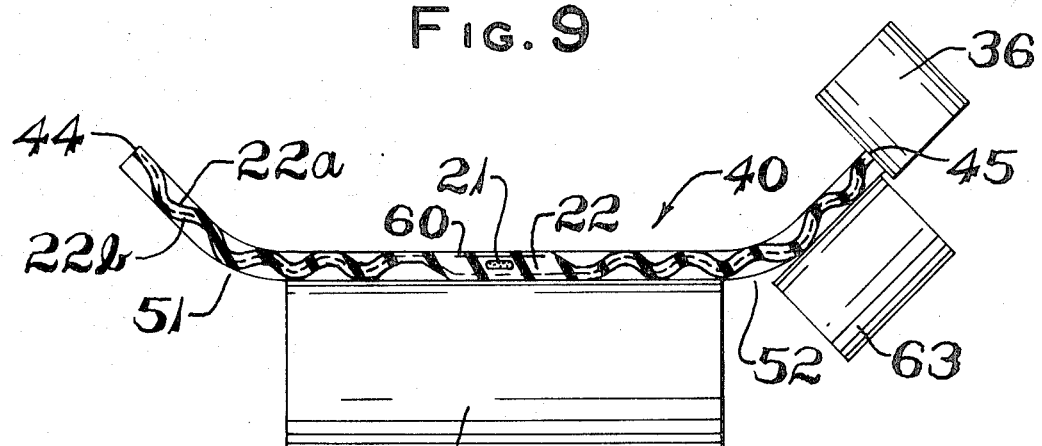
FIG. 9 shows the preferred arrangement of edge guide rollers.

Such a belt can be supported on conventional cylindrical horizontal rollers 62, preferably with the belt 40 operating in such a direction that the corrugated margins trail behind the central spine as indicated by the arrows B on FIGS. 5, 6, and 8. This kind of belt will operate quite smoothly with the smooth lower surface of the spine running in continuous contact with each of the supporting rollers 62 and with the corrugations 43 on each side successively engaging each of the rollers first at the portion nearest the center and continuing until the upwardly inclined margins 51, 52 are reached, at which contact of the corrugation with the horizontal rollers 62 ceases. The action of this belt is smooth without noticeable vibration even under heavy loads and high speeds, on both straight and curved runs.

With the acute angle corrugations 43, as with the right angle corrugations 23, guide rollers 36 should be provided at intervals and particularly on the inner edge of curved portions of the path of the belt as shown in FIG. 5. Although troughing rollers can be omitted entirely on straight runs as explained above, it is generally desirable to provide inclined rollers 63 under the upwardly inclined margin of the conveyor belt 40 on the inside of a sharp curve to insure that the edge face 45 of the belt will be maintained in proper position for engagement with the edge guide rollers 36, since the lateral force at the location of a sharp curve can be quite high and might otherwise cause deviation of the belt from the proper path. When the margins are inclined at 45° the guide rolls are accordingly provided as closely spaced pairs, one roller 63 under the inclined margin and the other roller 36 of the pair at right angles to the first, to engage the edge face 45 of the belt, with the axes of both rollers of each pair in a plane radial to the curve of the belt.

Figure 11:
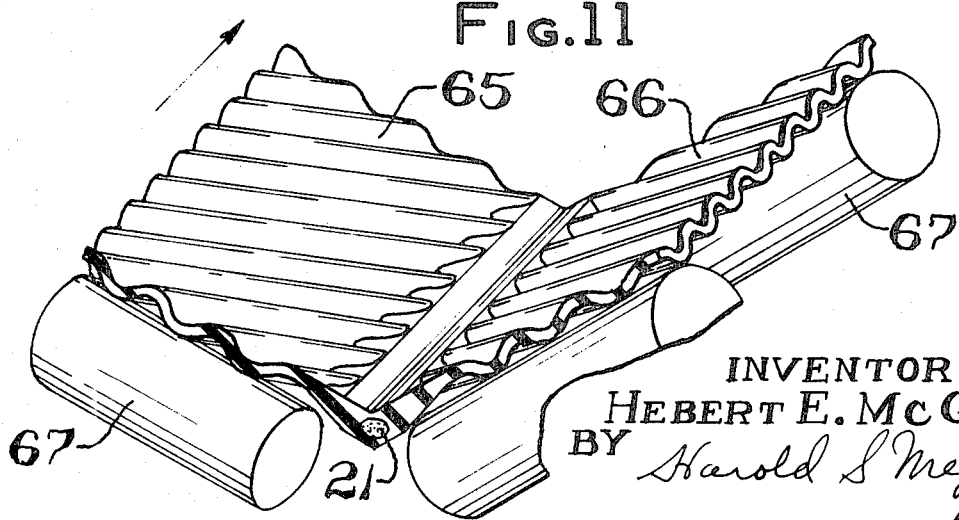
FIG. 11 shows another embodiment of the belt in which there is no flat horizontal center portion and the margins are upwardly inclined for their entire width.

Many of the same advantages explained above can be obtained by making the entire extent of the transversely corrugated margins with an upward inclination so that the general shape of the belt in cross section will be that of the letter V, as shown in FIG. 11. In this embodiment the central spine 21 is flanked by transversely corrugated margins 65, 66 inclined upward toward the edges on either side at a convenient angle which may be 45° so that the two margins 65, 66 are at right angles one to another. Again it is advantageous to have the corrugations at a trailing angle to the spine and to support the belt by inclined cylindrical rollers 67 with axes at right angles to the spine. The head and tail pulleys for such a belt may have conical surfaces to fit the inclination of the bottoms of the margins.

In all of the foregoing embodiments the return runs of the conveyor belts will be supported by essentially the same mechanisms as the upper load-carrying runs, except that the longitudinal spacing may be greater, and the width of supports and the inclination of the supports which are not horizontal must be such as to avoid interference with the belt structure.

In addition to the ability of these transversely corrugated belts to carry bulk goods satisfactorily on either straight or sharply curved paths, it is found that they have another substantial advantage in that the upwardly inclined margins in the case of troughed belts do not flatten out in passage around the head pulley of the conveyor system as do conventional flat conveyor belts, but instead keep their troughed shape while passing around the pulleys, because of the extensibility of the corrugated margins, so that the spillage of part of the load as the troughed belt flattens out which has frequently been observed in previously known belt conveyor systems simply does not occur. This permits these belts to be loaded to a substantially higher capacity without spillage than is possible with conventional belt systems.

I claim:

1. A conveyor belt for carrying bulk material in a path including both straight and transversely curved portions, the belt consisting essentially only of elastomer composition and flexible reinforcements, the body of the belt being a unitary relatively wide and thin mass of elastomer composition surrounding the flexible reinforcements and being transversely corrugated from a short distance either side of the center to the edges on either side with the corrugations having a depth such that the troughs in each face extend past the troughs in the other face, the belt having a central spine of essentially inextensible flexible reinforcement along its length and having closely spaced essentially inextensible flexible reinforcements across its width, wherein the center section separating the two corrugated sections is a flat strip.

2. A conveyor belt as in claim 1 in which the elastomer is reinforced by inextensible cords parallel to the corrugations.

3. A conveyor belt as in claim 1 in which the corrugations are at an acute angle to the spine.

4. A conveyor belt as in claim 1 in which the central portions of the corrugated margins extend horizontally from the spine and the outermost portions of the corrugated margins are upwardly inclined.

5. A conveyor belt as in claim 4 in which the corrugations are at an acute angle to the spine and are reinforced by inextensible cords parallel to the corrugations.

6. A conveyor belt as in claim 1 combined with longitudinally movable supporting surfaces bridging the corrugations.

7. A combination as in claim 6 in which the supporting surfaces are taut belts moving parallel to the conveyor belt.

8. A combination as in claim 6 in which the corrugations of the conveyor belt are at an acute angle to the spine and are closely spaced, and the supporting surfaces are transverse rollers, so that the rollers bridge the corrugations.

9. A conveyor belt as in claim 5 in which the corrugations are closely spaced, combined with transverse supporting rollers, so that the rollers bridge the corrugations.

10. A combination as in claim 6 including edge guide rolls bearing against an edge of the belt.

11. A combination as in claim 9 including pairs of edge guide rolls with axes at right angles, one roll of each pair supporting the upwardly inclined angular corrugations adjacent an edge of the belt, and the other roll of each pair bearing against the edge of the belt.

12. A flexible laterally stiffened belt consisting essentially of elastomer and flexible reinforcements, a major part of the width of the belt being transversely corrugated with the corrugations having a depth such that the troughs in each face extend past the troughs in the other face, the corrugated portion of the elastomer being reinforced by inextensible cords parallel to the corrugations.